Figure 1:
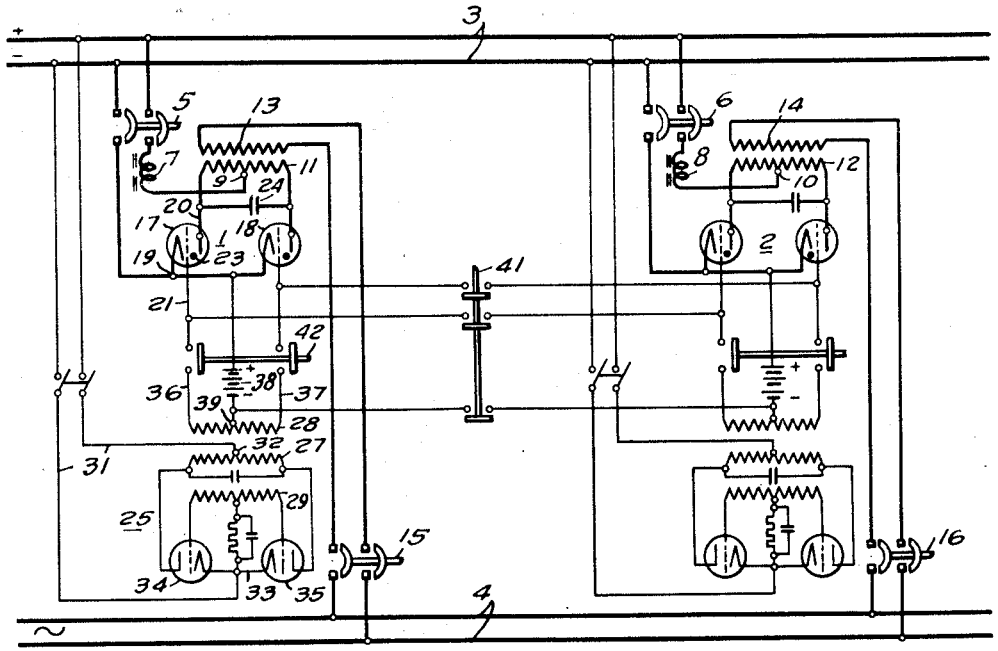

Sept. 19, 1950            J. L. BOYER            2,523,090

PARALLEL OPERATION OF CONVERTERS

Filed Dec. 14, 1946                          3 Sheets-Sheet 1

WITNESSES:            INVENTOR
John L. Boyer.
BY
ATTORNEY

Patented Sept. 19, 1950

2,523,090

UNITED STATES PATENT OFFICE 2,523,090

PARALLEL OPERATION OF CONVERTERS

John L. Boyer, Wilkinsburg, Pa., assignor to Westinghouse Electric Corporation, East Pittsburgh, Pa., a corporation of Pennsylvania Application December 14, 1946, Serial No. 716,194

15 Claims. (Cl. 171—97)

My invention relates to electronic power-conversion equipment for directly converting from alternating current of one frequency, or even from direct current, to alternating current of a different frequency, which may be either higher or lower than the input-frequency. Although not limited to any particular application, my invention is particularly applicable to the difficult case in which an electronic converter or inverter-system is called upon to supply alternating-current energy to a dead load, without the use of rotating equipment to establish the voltage and the frequency of the load-system. My invention has more particular relation to such conversion-apparatus involving two or more converters operated in parallel, with a single common output-frequency.

An important field of application of my invention is on large aircraft, where it is necessary to have a plurality of alternating-current generators, each driven by a different one of a plurality of main engines, or by other independent driving-means, to make the alternating-current power-supply reliable. This requires that the outputs of the generators be paralleled, so that any combination of generators and loads can be used, when some of the equipment fails.

If the inputs having such independently driven alternating-current generators are directly paralleled, the generator-speeds must, of course, be regulated to keep them identical, and several methods have been devised for this purpose, none of which have proved completely satisfactory. My present invention relates to a system in which there are a plurality of alternating-current generators or supply-lines, which may or may not have the same frequencies, or to a system in which there is a single alternating-current supply-line or bus, and there are a plurality of electronic converters or converter-tube assemblies, for converting the aforesaid input-power, and supplying power to a single alternating-current output-circuit or load-circuit having a frequency independent of the input-frequency. Such converters have certain advantages, related to avoiding the necessity for synchronizing the input-generators, if there are a plurality of such generators, and including reliable high-capacity operation, so that, in any case, it is desirable to utilize a plurality of electronic converters which are connected either in parallel or in series on their output-sides.

Another field of application of my invention, when the converter-outputs are connected in series, is a high-voltage direct-current transmission-system, in which the serially connected converters change the high-voltage direct-current energy into low-voltage alternating-current energy for supplying a load-circuit at the receiving end of the line.

The principal object of my invention is to provide a plurality of converters, each converting from an alternating-current or direct-current input-circuit or system or source, to a single alternating-current output-circuit having a frequency independent of the input-circuit or circuits, said converters including tubes having excitation-circuits which are firmly interconnected, so that the output-circuits of the several converters may be connected, either in series with each other, or in parallel, to the common output-circuit. There may be a separate input-circuit or source for each converter, or the input-circuits of the several converters may be connected together, either in series or in parallel, to a common supply-circuit or source.

While I refer to the supply-circuit and the load-circuit as input-circuits and output-circuits, respectively, I wish it to be understood that the direction of power-flow is reversible in some cases, so that power may be interchanged in either direction between these two circuits, the words "input" and "output," or "supply" and "load," being utilized, merely as a matter of convenience, to refer to circuits which ordinarily serve as the input and output circuits, respectively, in most applications of my inventions.

Figure 2:
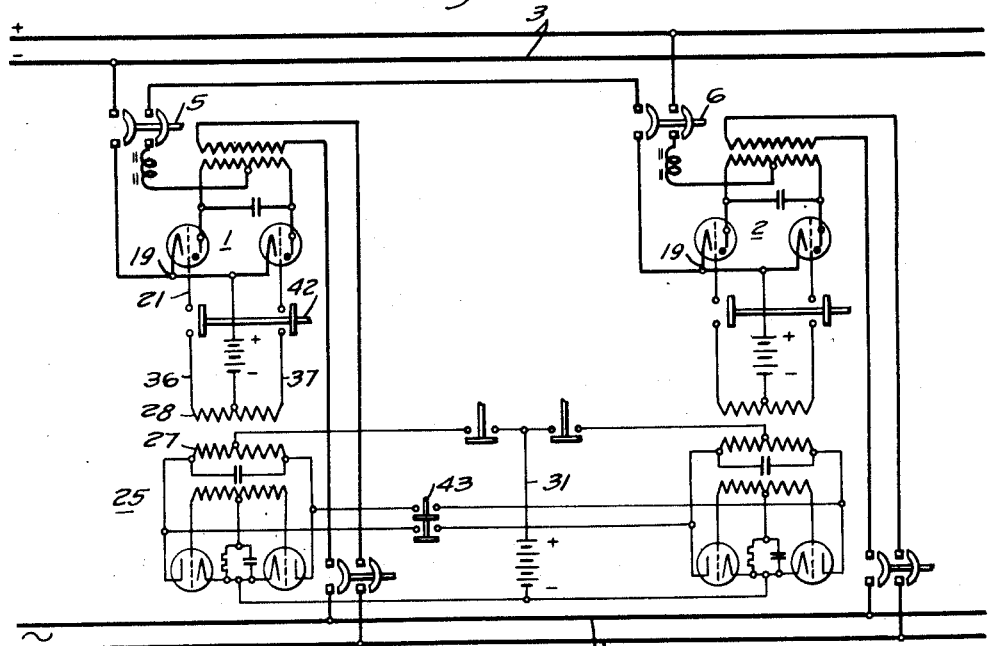
Figure 3:
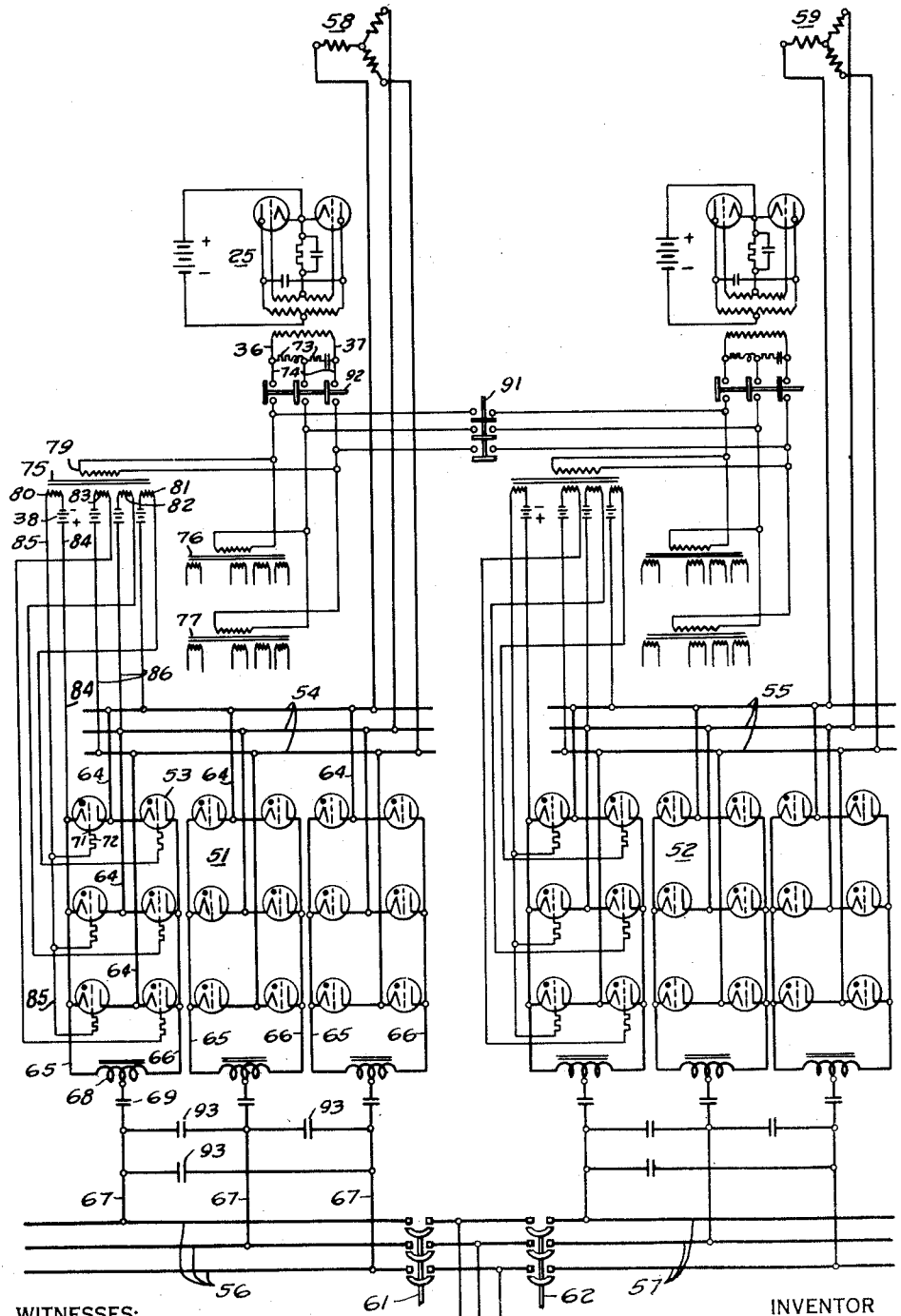
Figure 4:
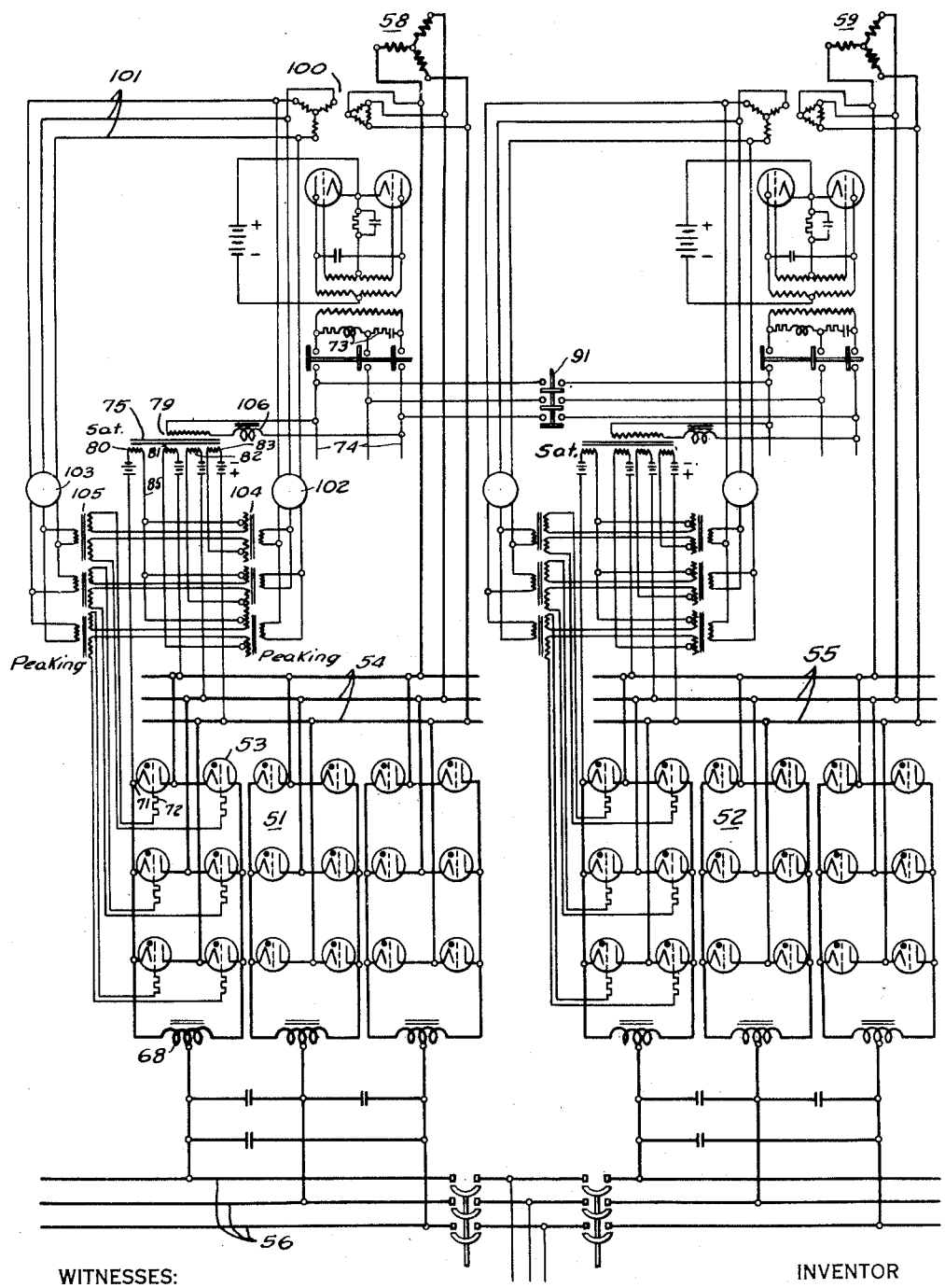

With the foregoing and other objects in view, my invention consists in the circuits, systems, combinations, apparatus, methods and parts, hereinafter described and claimed, and illustrated in the accompanying drawings, wherein, the four figures are simplified diagrammatic views of circuits and apparatus illustrating my invention in four different forms of embodiment;

Fig. 1 showing two simple single-phase inverters, operating in parallel from a common direct-current supply-line, and having their output-circuits operating in parallel on a common alternating-current load-circuit;

Fig. 2 showing the same converters with their direct-current circuits connected in series;

Fig. 3 showing two three-phase converters, energized from two independent three-phase sources which may have differing frequencies, and supplying a common three-phase load-circuit at a frequency which is independent of either one of the input-frequencies; and Fig. 4 showing the same two three-phase converters with a different form of control, adapting them for power-flow in either direction.

Fig. 1 shows the basic idea, as applied to two simple single-phase inverters 1 and 2, operating in parallel from a common direct-current supply-circuit 3, and supplying energy to a common single-phase output-circuit 4, which may be a dead-load circuit such as has been previously mentioned. The inverters have their power-circuits connected to the direct-current supply, through breakers 5 and 6, respectively, and through direct-current reactors 7 and 8, respectively, and also through the mid-taps 9 and 10 of the primary windings 11 and 12 of two output-transformers 13 and 14, respectively. The output-circuits of the transformers 13 and 14 are connected to the load-circuit 4, through breakers 15 and 16, respectively.

The inverters 1 and 2 are identical, so that a description of one will suffice for both. The inverter 1 is illustrated as a simple type of inverter, comprising two tubes 17 and 18, each having a cathode-circuit 19, an anode-circuit 20, and a control-circuit 21. While my invention is applicable to inverters having any kind of tube in which the main anode-cathode circuit is controlled by a grid-circuit or other control-circuit, the invention will have its most usual application in connection with tubes having a gas or vapor filling, or other means for causing the control-electrode of the tube to be ineffective, in general, to stop the firing of the tube, once the firing has been initiated, as has been symbolically indicated by the convention of a tiny circle or dot 23, which has been placed within the diagrammatic representation of each converter-tube. Each of the main power-tubes 17 and 18 of the converter may be either a hot-cathode gas-filled tube or an ignitron.

The main power-circuits of the inverter 1 are illustrated in a typical inverter-circuit in which a capacitor 24 is connected across the anode-circuits 20 of the two tubes 17 and 18, these anode-circuits being connected to the respective terminals of the primary winding 11 of the output-transformer 13. The two cathode-circuits 19 of the two tubes 17 and 18 are connected together and to the negative circuit of the direct-current supply-line 3.

The excitation-circuits 21 of the two main power-tubes 17 and 18 of the inverter 1 are energized from a suitable source of single-phase current having the frequency which is desired for the output-circuit 4 of the inverter. For the sake of illustration, the excitation-circuit source is illustrated as comprising a two-tube oscillator 25, having a transformer having a primary winding 27, a secondary or output-winding 28, and a tertiary or feed-back winding 29. The oscillator 25 is energized from a direct-current circuit 31 which is connected between the midpoint 32 of the primary winding 27 and the common cathode-circuit 33 of the two oscillator-tubes 34 and 35. The secondary winding 28 of the oscillator-transformer has its terminals, 36 and 37, connected to the respective control-circuits 21 of the main power-tubes 17 and 18 of the inverter 1. The control-circuit of the main power-tubes is completed by means of a negative biasing battery 38 which is connected between the cathode-circuits 19 and the midpoint 39 of the oscillator-secondary 28.

In accordance with my invention, the excitation-circuits 21 of the two inverters 1 and 2, in Fig. 1, are connected together through a three-pole contactor 41, which joins each of the two control-circuits 21 of the inverter 1 to the corresponding control-circuit of the inverter 2, and which joins the mid-contact circuit 39 of the inverter 1 to the corresponding circuit of the inverter 2. The general principle of the control-circuit interconnection 41 is that the control-circuits of the two inverters 1 and 2 shall be tied together as strongly as is practicable, by joining corresponding portions of the oscillator-circuits 25, which determine the output-frequency of the respective inverters, so that the two inverters will operate as if they had a single source of control-frequency, for determining the frequency of the output-circuits or transformer-secondaries 13 and 14 of the two inverters.

While it would be possible to utilize a single control-circuit, or a single control-circuit frequency-determining source, for the two inverters 1 and 2, it is usually desirable, as shown, to provide a separate control-circuit source 25 for each inverter, and to parallel them, so that, in the event of failure of either control-circuit source 25, the other one may be utilized, alone, to control the main power-tubes of both inverters 1 and 2, the damaged control-circuit source being isolated by means of a two-pole switch or contactor 42 in series with the secondary output-terminals 36 and 37 of the damaged oscillator 25.

In the operation of the invention, as shown in Fig. 1, it will be noted that the interconnection or tie 41, between the control-circuits 21 of the main power-tubes of the respective inverters 1 and 2, insures that the output-circuits, or the transformer-windings 13 and 14 of the two inverters 1 and 2, shall always deliver alternating currents which have the same frequency and the same phase-relation, so that the two output-circuits may be connected together, either in parallel or in series-circuit relation, to the common output or load-circuit 4, the parallel connection being illustrated.

Fig. 2 shows a modification of Fig. 1, in which the two direct-current input-circuits of the two inverters 1 and 2, as controlled by the circuit-breakers 5 and 6, respectively, are connected in series with each other, across the direct-current supply-line 3, as distinguished from the parallel supply-circuit connection which is shown in Fig. 1. This adapts Fig. 2 to supply a low-voltage alternating-current load-circuit 4 from the receiving end of a high-voltage direct-current transmission-line 3, the load-circuit 4 having no frequency-determining means other than the control-circuits 21 of the main-power-tubes of the inverters 1 and 2. In Fig. 2, since the two inverters 1 and 2 are in series-circuit relation, on the direct-current side, the cathode-circuits 19 of the respective inverters are not at the same potential, so that the frequency-determining interconnection 41 of Fig. 1 has to be replaced by a contactor 43 which interconnects corresponding portions of the two oscillators 25, at some place other than the transformer-secondary terminals 36 and 37 as in Fig. 1. In Fig. 2, the interconnecting contactor 43 is a two-pole contactor which interconnects the corresponding terminals of the primary windings 27 of the two oscillators 25.

Fig. 3 shows my invention embodied in the form of a three-phase electronic frequency-changer or converter. By way of illustrating a plurality of converters having a common output-frequency, I have illustrated the existence of a plurality by showing two converters 51 and 52, with the understanding that three or more converters might have been utilized. A similar remark applies, of course, to Figs. 1 and 2.

Each converter 51 and 52, of Fig. 3, comprises eighteen main power-tubes 53, which may be similar to the previously described power-tubes 17 and 18 of Fig. 1. Each of the converters 51 and 52 has its own three-phase input-circuit 54 or 55, as the case may be, and its own three-phase output-circuit 56 or 57, as the case may be. The input-circuits 54 and 55 may be energized from separate three-phase generators 58 and 59, respectively, which may, or may not, have the same frequencies, and if they have the same frequencies, they may, or may not, be paralleled, no paralleling generator-connection being shown. The two three-phase output-circuits 56 and 57 are shown as being paralleled, by being connected to a common three-phase load-circuit 60, through circuit-breakers 61 and 62, respectively.

The main power-circuits of the two converters 51 and 52 of Fig. 3 are similar, so that a description of one will suffice for both, and these power-circuits embody improvements which constitute the subject-matter of my copending application, Serial No. 716,195, filed simultaneously herewith and now U. S. Patent No. 2,442,257 of May 25, 1948.

The eighteen tubes 53 of the converter 51 are arranged in pairs of tubes, connected back-to-back, that is, with the anode of one tube, and the cathode of the other tube, of each pair, connected together, and to one of the phases of the three-phase input-circuit 54, as shown at 64. The cathode-circuit 65 of the first tube, and the anode-circuit 66 of the second tube, are connected at 67, to one of the phases of the three-phase output-circuit 56, through a serially connected inductor 68 and a serially connected capacitor 69. The inductor 68 is preferably a mid-tapped inductor, as shown, the terminals of which are connected to the cathode and anode output-circuits 65 and 66, respectively, while the mid-tap of the inductor is connected to the series capacitor 69, and thence to the connection 67 which leads to one of the conductors of the three-phase output-circuit 56.

On the input-side of the converter, each phase of the three-phase input-circuit 54 supplies three pairs of power-tubes 53, having their back-to-back input-circuits 64 connected to the same phase of the three-phase supply-circuit 54 in Fig. 3.

The three pairs of cathode and anode output-circuits 65 and 66 of the three pairs of tubes which are connected to a common input-phase are connected, at 67, to the three different phases of the output-circuit 56, as shown. Each pair of cathode and anode output-circuits 65 and 66, which is connected to any one of the several output-phases of the output-circuit 56, is connected to the three pairs of tubes 53 which have their back-to-back input-circuits 64 connected to the three different input-phases of the input-circuit 54, as shown in Fig. 3.

Each of the eighteen main power-tubes 53 of Fig. 3 has a control-circuit conductor 71 which is energized in series with a current-limiting grid-resistance 72.

In Fig. 3, the control-circuits for the converter 51 are energized from a single-phase oscillator 25, which may be similar to the oscillator 25 which is shown in Fig. 1, except that the single-phase output-terminals 36 and 37 of the oscillator are connected, through a phase-splitting network 73, to a three-phase control-circuit 74, which energizes the primary windings of three control-circuit transformers 75, 76 and 77, one for each of the output-phases of the output-circuit 56.

Since the three control-circuit transformers 75, 76 and 77 are identical, a description of one will suffice for all, and to simplify the drawings, the control-circuit output-connections are shown for only one of the transformers, 75, with the understanding that the other two transformers, 76 and 77, serve the control-circuits 71 for the tubes 53 which feed power into the other two phases of the output-circuit 56.

The control-circuit transformer 75 has a primary winding 79 and four secondary windings 80, 81, 82 and 83. Each of these secondary windings is connected, through a separate negative biasing-battery 38, between the cathode-circuit and the grid or control-circuit 71 of its appropriate tube 53.

Considering the six main tubes 53 which energize the first phase of the output-circuit 56, it will be noted that three of the cathodes of these six tubes are connected together, in the connection which is marked 65, and this connection 65 is connected, at 84, through an individual biasing-battery 38, to the right-hand terminal of the secondary winding 80. The left-hand terminal of the secondary winding 80 is connected, at 85, to all three of the control-circuits 71 of the three main tubes 53 which have their cathodes connected to the common cathode-circuit 65.

The other three tubes, of the six main tubes 53 which energize the first phase of the output-circuit 56, have three separate cathode-circuits, all designated by the numeral 64, which are connected to the three different phases of the input-circuit 54, so that these three cathodes are at different potentials. Each of these three cathodes is connected, through a separate connection 86, and through a separate biasing-battery 38, to the left-hand terminal of one of the secondary windings 81, 82 and 83, respectively, and the right-hand terminals of these several secondary windings are connected to the respective control-circuits 71 of the corresponding main tubes 53.

In accordance with my present invention, the three-phase control-frequency circuit 74 of the converter 51 is joined to the corresponding circuit of the converter 52 by a three-pole contactor 91; and a damaged oscillator 25 can be disconnected by a three-pole contactor 92, as explained in connection with Fig. 1.

In the operation of the apparatus as shown in Fig. 3, and as more particularly described and claimed in my aforementioned copending application, it will be noted that each output-phase of the electronic frequency-changer or converter 51 consists of two groups of tubes 53, namely the three tubes having the common-cathode output-circuit 65, and the three tubes having the common-anode output-circuit 66. The three tubes 53 which have the common-cathode output-circuit 65 are controlled at the same phase-angle of the control-circuit frequency, while the three tubes 53 which are connected to the common-anode output-circuit 66 are controlled with a control-frequency phase-angle which is dispaced 180° on a control-frequency basis. More specifically, considering the first control-circuit transformer 75, and the first pair of output-circuits 65 and 66, it is noted that the three tubes 53 which are connected to the common-cathode output-circuit 65 are controlled by the secondary winding 80, from which they receive a sufficiently positive control-grid voltage, for firing purposes, at one particular phase-angle during each cycle of the control-frequency voltage. Each of these three tubes then stands ready to fire, whenever its anode is more positive than its cathode, due to the respective input-voltages which are impressed upon the anodes by the supply-circuits 64 which are connected to the several input-phases of the input-circuit 54. The firing of the other three tubes 53, which are connected to the common-anode output-circuit 66, takes place 180 electrical degrees later, on an output-frequency basis, under the control of the secondary windings 81, 82 and 83.

When a positive half-cycle of the output-frequency current first begins to flow through the common-cathode output-circuit conductor 65, of the first phase of the output-circuit 56, as a result of the firing of one of the three tubes 53 which are connected to this cathode-circuit 65, the full rectified voltage of this tube is at first applied to the load-circuit conductor 67 and the left-hand half of the reactor 68, because the voltage-drop through the serially connected capacitor 69 is zero at the first instant of current-flow in the output-frequency cycles. When the next input-phase of the input-circuit 54 becomes more positive than the input-phase which is connected to the tube 53 which first fired, the tube corresponding to said more positive phase fires, extinguishing the previously firing tube, and taking over the burden of carrying the first half-cycle of the output-frequency current, in the first output-phase of the output-circuit 56, and in the corresponding load-circuit conductor 67.

Meanwhile, the serially connected commutating-capacitor 69 is becoming more charged, and as it becomes more charged its voltage increases, until finally the capacitor-voltage is equal to the impressed rectifier-voltage of the cathode output-circuit 65, and this half-cycle of the output-frequency current is thus brought to zero. This explanation presupposes that a load-current is being supplied by the output-circuit 56.

At full load, each serially connected capacitor 69 cuts off the positive half-cycle of its phase of the output-current, some 40 output-frequency degrees (more or less) before the firing of the negative tube-groups, that is, before the grid-circuit 71 becomes sufficiently positive, for firing purposes, in the three tubes 53 which are connected to the common-anode output-circuit 66 which is paired with the cathode output-circuit 65 which has just been considered. This time-delay of 40 output-frequency degrees (more or less), during which neither the positive tube-group nor the negative tube-group is fired, in each pair of positive and negative groups, allows adequate time for the deionization of the space within the various tubes after they cease carrying current, and before any tube is again called upon to act as an insulator or open circuit-interrupter to a forward current in the tube; and this deionizing time-delay is increased when the output-current increases. Thus, in the event of a short-circuit on the output-circuit, the output-current is very heavy, resulting in charging the respective serially connected commutating-capacitors 69 more quickly during each output-frequency half-cycle, thus increasing the deionizing time and the ability of the tubes to carry these heavy overload-currents without failure.

When the negative tube-group is firing, that is, the group of three tubes 53 which are connected to the common-anode output-circuit 66, the serially connected commutating-capacitor 69 becomes charged in the opposite direction, and the operation is repeated.

As more particularly described and claimed in my previously mentioned copending application, I make a special use of the output-circuit reactors 68, in combination with a group of delta-connected, or parallel-connected, output-circuit capacitors 93 and also in combination with the serially connected commutating-capacitors 69.

The inductive reactors 68 cooperate with the serially connected commutating-capacitors 69 to provide a sort of tuned circuit, so as to assist in the charging and discharging of the series commutating-capacitors as previously described.

It is also quite desirable for the reactors 68 to have a certain amount of input-frequency reactance, so as to limit the amount of fault-current which could flow, from terminal-to-terminal through the reactor, in the event of a fault on any one of the main power-tubes 53. This circulating fault-current has to be limited to a value which can be commutated by the tubes, so that the next good tube will clear a momentary fault which occurs in a faulted tube. The faulted tube may have time to recover before it is called upon to carry current again, during its next operating-period in the cycle of operation.

The other capacitors, or the parallel-connected capacitors 93, cooperate with the series reactors 68 to neutralize some of the output-frequency inductive reactance of the reactors 68, making it possibe to utilize larger reactors; and the parallel-connected capacitors 93 also improve the wave-form of the output-voltage by reducing the ripples.

The parallel-connected capacitors 93 also supplement the action of the serially connected commutating-capacitors 69. If it were not for the parallel-connected capacitors 93, the serially connected commutating-capacitors 69 would not be operative, at no load, or at light loads, because the series commutating-capacitors 69 would not become charged sufficiently to commutate the current, or reduce it to zero, before the next positive or negative group of tubes is fired, thus resulting in both positive and negative tube-groups firing simultaneously, resulting in a short-circuit on the supply-system. The parallel-connected capacitors 93 are effective, during light loads, to draw their own charging-current, which passes through the serially connected commutating-capacitors 69, so that the latter become fully charged, say some ten degrees before the termination of each output-frequency half-cycle, even at no-load, so as to provide a ten-degree period during which neither the positive nor the negative tube-group is firing, thus avoiding a failure to commutate, at light loads.

In Fig. 3, as more particularly described and claimed in my aforesaid copending application, the serially connected reactors 68 are each in the form of two mutually coupled reactors, each reactor being one-half of the mid-tapped reactor 68. This circumstance, coupled with the reactance-neutralizing effects of the series and shunt-connected capacitors 69 and 93, respectively, makes it possible to utilize large reactors 68, each half of which has a voltage which, under certain conditions, is high enough to commutate the output-current, even when one tube-group, of any pair of positive and negative tube-groups, is fired while the other tube-group is still carrying current. This is possible, because the firing of the second group of tubes, while the first group of the pair of groups is still carrying current, will produce a counter-electromotive force in the half of the reactor 68 which is in series with the previously conducting tube-group, thus causing the current in the previously conducting tube-group to go to zero whenever a larger current starts to flow in the newly fired group of tubes.

In other words, if the firing of a tube in the negative group, (which is connected to the anode output-circuit 66, and thence to the first phase of the output-circuit 56), occurs at an instant when a tube of the positive group, (which is connected to the first cathode output-circuit 65), is still carrying current, that is, when one of the cathode-circuit-connected tubes is still carrying current, then the current in the anode-circuit 66 will become larger than the current in the cathode-circuit 65, because the anode-circuit 66 will be supplying load-current to the output-circuit 56, and to the serially and shunt-connected capacitors 69 and 93, thus inducing a voltage, in the left-hand half of the reactor 68, which will make the cathode-circuit 65 more positive than the impressed anode-voltage of the supply-conductor 64, in the tube which was previously carrying current, thus extinguishing that tube.

The system which is shown in Fig. 3 is particulary useful, for example, in airplane service, in which the two three-phase generators 58 and 59 may have a variable input-frequency of from 300 cycles to 900 cycles, by way of example, without having the two input-frequencies exactly the same values, or synchronized with each other. The output-frequency of the load-circuit 60 may be 400 cycles, for example, although I am not limited to any particular frequencies, of course.

Regardless of the relative phases or frequencies of the two input-circuits 54 and 55, the parallel connection 91 of the two control-circuits assures a positive or "infinite bus" source of control-frequency voltage, which is common to the two converters 51 and 52, and which does not substantially vary in voltage, because of the control-circuit currents which are drawn by the control-circuits of the respective converters 51 and 52. Because of this circumstance, it is possible to parallel the two output-circuits 56 and 57, by closing the breakers 61 and 62, thus supplying a load-circuit 60 which might normally be energized from both generators 58 and 59, parallel through their respective converters 51 and 52, or, in the event of the failure of either generator or either converter, or under light-load conditions, the load-circuit 60 might be energized from either generator alone, by opening the other circuit-breaker 61 or 62, as the case may be.

So far, in Figs. 1, 2 and 3, I have illustrated my invention, either in connection with inverters, which are converters for converting from direct-current to alternating-current, or in connection with an alternating-current converting-system which converts from alternating-current of one frequency to alternating current of another frequency, without passing through a direct-current stage, but the illustrations have referred to systems in which the direction of current-flow could not be reversed. Thus, in Fig. 3, the control-circuits of the main power-tubes 53 were provided with output-frequency firing-impulses during all portions of each input-frequency cycle, which means that the power-tubes 53 would fire only as rectifiers, and current would flow only from the input-circuit 54 or 55 to the output-circuit 56 or 57, and the converters would not conduct current flowing from the output-circuit to the input-circuit.

Converters are known, however, which are capable of carrying current in either direction, or of effecting an energy-exchange in either direction, between the input-circuit and the output-circuit, that is, from the input-circuit to the output-circuit, or from the output-circuit to the input-circuit. My present invention, relating to the strong interconnecting-tie between the control-circuits of two converters, is applicable also to such reversible-power-flow converters.

In Fig. 4, I have shown my invention applied to a so-called cycloconverter, that is, to an electronic converter in which the several tubes are operable first as rectifiers and then as inverters, in different portions of the input-frequency cycle: hence the name cycloconverters. The particular feature of the cycloconverter which is shown in Fig. 4 is the provision of suitable input-frequency control-circuit means, in series with the output-frequency control-circuit means and the biasing battery of Fig. 3. The combination including the input-frequency control-circuit means is generally described and claimed in a joint application of C. G. Hagensick and myself, Serial No. 739,723, filed concurrently herewith and now U. S. Patent No. 2,442,261 of May 25, 1948. The application of the output-frequency control-circuit parallel-bus connection 91, to such a cycloconverter circuit, is a feature of my present invention.

In Fig. 4, the main converter-circuits are the same as in Fig. 3, except for the omission of the series-connected commutating-capacitors 69 of Fig. 3, and the relative frequency-ratios at which the system would be operated. The only difference between the control-circuits of Figs. 3 and 4 is the addition of serially connected input-frequency control-voltages in Fig. 4. Since the control-circuits for the two cycloconverters 51 and 52, in Fig. 4, are identical, a description of one will suffice for both.

Thus, in Fig. 4, an auxiliary input-frequency transformer 100 is provided, which is energized from the three-phase generator 58, or from the three-phase input-circuit 54. The auxiliary transformer 100 energizes an auxiliary or control-circuit bus 101 which provides a three-phase voltage having the same frequency as the input-frequency of the converter 51, which now may be called a cycloconverter. Control-circuit voltages are supplied through two phase-shifters 102 and 103, to two sets of input-frequency single-phase transformers 104 and 105, respectively, of the "peaker" type, that is, transformers having greatly saturated cores, which produce secondary voltage-peaks of relatively brief duration. The set of peaker-transformers 104 produces relatively low-voltage secondary-voltage peaks, which are phased (as by the adjustment of the phase-shifter 102) suitably for firing the control-circuits 71 of the main power-tubes 53 for rectifier-operation, as will be subsequently described; while the group of peaker-transformers 105 produce secondary-voltage peaks of a higher voltage, which are phased (as by adjustment of the phase-shifter 103) for the firing of the main tubes 53 for inverter-operation.

There are six output-phases of each of the two groups of peaker-transformers 104 and 105, one for each of the six main tubes 53 which are utilized for supplying one phase of the output-circuit 56. For convenience in illustration, the complete control-circuits for only one of the output phases of each of the cycloconverters 51 and 52 are shown in Fig. 4.

As shown in Fig. 4, the proper rectifying peaker-phase, of one of the secondaries of the low-voltage peaker-transformers 104, and the proper inverting peaker-phase of one of the secondaries of the high-voltage peaker-transformers 105, are connected in series with each other and in series with the control-circuit 71 of the corresponding main tube 53, being connected between said control-circuit or grid of the tube and the corresponding one of the secondary windings 80, 81, 82 and 83 of the output-frequency control-circuit transformer 75, such as have already been described in connection with Fig. 3.

In Fig. 4, however, it is preferable, as explained in said joint application, for the output-frequency control-circuit voltage to have an approximately square-topped wave-form, and, to this end, the output-frequency transformer 75 is saturated, but not saturated sufficiently severely to produce a peaked output or secondary voltage-wave, but saturated just enough to produce an approximately square-topped output or secondary wave. Preferably, also, the primary winding 79 of the output-frequency transformer 75 is connected in series with a reactor 106, which absorbs the difference between the square-topped wave and the sine-wave which must be maintained on the three-phase output-frequency control-voltage circuit 74, in order that the phase-splitting network 73 may operate properly.

In the operation of the system which is shown in Fig. 4, the rectifying-action firing-controlling peaks of the transformers 104 are blocked during the negative half-cycles of the square-topped output-frequency voltage-wave which is connected serially therewith, so that the rectifying action can be started only during one-half of each cycle of the output-frequency. For the best, satisfactory operation, the output-frequency should be considerably lower than the input-frequency, say less than one-half or one-third of the input-frequency, so that several input-frequency phases will conduct current during each output-frequency half-cycle.

Thus, in Fig. 4, I block the rectifying firing-action during one-half of each output-frequency cycle, while permitting the inverting peaks to always produce a sufficiently positive control-voltage to initiate firing, (provided always that the anode-circuit of the tube is at a higher positive potential than the cathode). The effect of this control-operation is to so delay the firing of the tubes, during each input-frequency cycle, as to permit inverter-operation of the tubes during those half-cycles of the output-frequency in which the rectifying peaks are blocked. This makes it possible for the cycolconverter to deliver output-currents at other than unity power-factor, or with current flowing in either direction to or from the output-circuit.

On account of the operation just described, it is usually not necessary or desirable, in Fig. 4, to utilize the serially connected commutating-capacitors 69 which were required in Fig. 3. The current-commutating function of the series capacitors 69 of Fig. 3 is taken over, in Fig. 4, by the commutating operation of the tubes themselves, aided by the mid-tapped reactors 68, which operate as paralleling reactors, aiding in the commutation.

While I have described my invention in connection with four specific illustrative forms of embodiment thereof, I wish it to be understood that my invention is not limited to these particular applications, and that many changes of substitution, omission or addition may be made, without departing from the essential spirit of the invention. I desire, therefore, that the appended claims shall be accorded the broadest construction consistent with their language.

I claim as my invention:

1. In combination, means for providing a plurality of alternating-current supply-circuits, a common alternating-current load-circuit having a frequency independent of any supply-circuit, a separate electronic converter between each alternating-current supply-circuit and the common load-circuit, each converter having a separate output-frequency control-circuit including a separate output-frequency source, and means for providing a strong interconnection between the output-frequency control-circuits of all of the converters.

2. In combination, means for providing a plurality of alternating-current supply-circuits, a common alternating-current load-circuit having a frequency independent of any supply-circuit, a separate electronic converter between each alternating-current supply-circuit and the common load-circuit, each converter having a separate output-frequency control-circuit oscillator, and means for providing a strong interconnection between the output-frequency oscillators of all of the converters.

3. In combination, a plurality of electronic converters, each converter comprising a plurality of power-tubes each having a main anode-cathode circuit and a control-electrode which is, in general, ineffective to stop the firing of the tube, once the firing has been initiated; a separate output-frequency oscillator-means, connected in the control-circuits of the power-tubes of each of the converters, the oscillator-means of all of the converters having the same frequency; strong-tie connecting-means for parallel-connecting the oscillator-means of a plurality of said converters; an alternating-current load-circuit of a type which does not determine its own frequency; and connecting-means for connecting the outputs of said plurality of converters to said load-circuit.

4. In combination, a direct-current supply-circuit; an alternating-current load-circuit of a type which does not determine its own frequency; a plurality of electronic inverter-assemblies; connections for causing each inverter-assembly to be energized from the direct-current supply-circuit, and to supply power to the alternating-current load-circuit; each inverter-assembly comprising a plurality of power-tubes each having a main anode-cathode circuit and a control-electrode which is, in general, ineffective to stop the firing of the tube, once the firing has been initiated; control-means for causing each of the power-tubes to be operable as an inverter but not as a rectifier, said control-means including a separate output-frequency oscillator-means, connected in the control-circuits of the power-tubes of each of the inverter-assemblies, the oscillator-means of all of the inverter-assemblies inherently having substantially the same frequency; and strong-tie connecting-means for parallel-connecting the oscillator-means of all of said inverter-assemblies.

5. The invention as defined in claim 4, characterized by the fact that the several inverter-assemblies are parallel-connected to the direct-current supply-circuit.

6. The invention as defined in claim 4, characterized by the direct-current supply-circuit being the receiving end of a high-voltage direct-current transmission-line, the alternating-current load-circuit being a circuit of relatively lower voltage than the transmission-line, and the several inverter-assemblies being series-connected to the direct-current transmission-line and parallel-connected to the alternating-current load-circuit.

7. In combination, a plurality of separate alternating-current power-sources of unrelated frequencies; an alternating-current load-circuit of a type which does not determine its own frequency; a plurality of electronic converters; connections for causing the input-circuit of each converter to be energized from its own power-source; connecting-means for connecting the output-circuits of all of said converters to supply power to said load-circuit; each converter comprising a plurality of power-tubes each having a main anode-cathode circuit and a control-electrode which is, in general, ineffective to stop the firing of the tube, once the firing has been initiated; control-means for impressing the control-electrodes of all of the power-tubes with an output-frequency control-voltage, but not with an input-frequency control-voltage, said control means including a separate output-frequency oscillator-means connected in the control-circuits of the power-tubes of each of the converters, the oscillator-means of all of the converters having the same frequency independent of all of the power-source frequencies; and strong-tie connecting-means for parallel-connecting the oscillator-means of a plurality of said converters.

8. In combination, a plurality of separate alternating-current power-sources of unrelated frequencies; an alternating-current load-circuit of a type which does not determine its own frequency; a plurality of electronic converters; connections for causing the input-circuit of each converter to be energized from its own power-source; connecting-means for connecting the output-circuits of all of said converters to supply power to said load-circuit; each converter comprising a plurality of power-tubes each having a main anode-cathode circuit and a control-electrode which is, in general, ineffective to stop the firing of the tube, once the firing has been initiated; control-means for causing each of the power-tubes to be operable to supply power from its power-source to its output-circuit, but not contrariwise, said control-means comprising a separate output-frequency oscillator-means, connected in the control-circuits of the power-tubes of each of the converters, the oscillator-means of all of the converters having the same frequency independent of all of the power-source frequencies; and strong-tie connecting-means for parallel-connecting the oscillator-means of a plurality of said converters.

9. In combination, a plurality of electronic converters, each converter comprising a plurality of power-tubes each having a main anode-cathode circuit and a control-electrode which is, in general, ineffective to stop the firing of the tube, once the firing has been initiated; an alternating-current input-circuit for each converter; an alternating-current output-circuit for each converter, the output-circuit being at a lower frequency than the input-circuit; a control-circuit for each power-tube, said control-circuit including input-frequency voltage-modulating means individual to each tube, and approximately square-wave output-frequency voltage-modulating means applying to groups of tubes according to output half-phases, said output-frequency voltage-modulating means including a separate output-frequency oscillator-means, connected in the control-circuits of the power-tubes of each of the converters, the oscillator-means of all of the converters having the same frequency; strong-tie connecting-means for parallel-connecting the oscillator-means of a plurality of said converters; an alternating-current load-circuit of a type which does not determine its own frequency; and connecting-means for connecting the output-circuits of all of said converters to said load-circuit.

10. The invention as defined in claim 9, characterized by each input-frequency voltage-modulating means comprising a source of relatively low-voltage input-frequency peaks, phased to initiate the rectifier-operation of the associated tube, and a source of higher-voltage input-frequency peaks, phased to initiate the inverter-operation of the associated tube, the output-frequency modulator-wave alternately blocking and unblocking the rectification-initiating peaks, but never blocking the inversion-initiating peaks.

11. In combination, means for providing a plurality of alternating-current supply-circuits, a common alternating-current load-circuit having a frequency independent of any supply-circuit, a separate electronic converter between each alternating-current supply-circuit and the common load-circuit, each converter comprising a plurality of power-tubes each having a main anode-cathode circuit and a control-electrode which is, in general, ineffective to stop the firing of the tube, once the firing has been initiated; a separate output-frequency oscillator-means, connected in the control-circuits of the power-tubes of each of the converters, the oscillator-means of all of the converters having the same frequency; strong-tie connecting-means for parallel-connecting the oscillator-means of a plurality of said converters; an alternating-current load-circuit of a type which does not determine its own frequency; and connecting means for connecting the outputs of said plurality of converters to said load-circuit.

12. In combination, a direct-current supply-circuit; an alternating-current load-circuit of a type which does not determine its own frequency, a plurality of electronic converter-assemblies; connections for causing each converter-assembly to be energized from the direct-current supply-circuit, and to supply power to the alternating-current load-circuit; each converter comprising a plurality of power-tubes each having a main anode-cathode circuit and a control-electrode which is, in general, ineffective to stop the firing of the tube, once the firing has been initiated; a separate output-frequency oscillator-means, connected in the control-circuits of the power-tubes of each of the converters, the oscillator-means of all of the converters having the same frequency; strong-tie connecting-means for parallel-connecting the oscillator-means of a plurality of said converters; an alternating-current load-circuit of a type which does not determine its own frequency; and connecting-means for connecting the outputs of said plurality of converters to said load-circuit.

13. In combination, a supply-circuit; an alternating-current load-circuit of a type which does not determine its own frequency, a plurality of electronic converter-assemblies; connections for causing each converter-assembly to be energized from the supply-circuit, and to supply power to the alternating-current load-circuit; each converter-assembly comprising a plurality of power-tubes each having a main anode-cathode circuit and a control-electrode which is, in general, ineffective to stop the firing of the tube, once the firing has been initiated; control-means for causing each of the converter assemblies to be operable to transmit power in a single direction, said control-means including a separate output-frequency oscillator-means, connected in the control-circuits of the power-tubes of each of the converter-assemblies, the oscillator-means of all of the converter-assemblies inherently having substantially the same frequency; and strong-tie connecting-means for parallel-connecting the oscillator-means of all of said converter-assemblies.

14. The invention defined in claim 13, characterized by the fact that the several converter-assemblies are parallel-connected to the supply-circuit.

15. In combination, a plurality of independent supply circuits, an alternating-current load-circuit of a type which does not determine its own frequency; a plurality of electronic converter-assemblies; connections for causing each converter-assembly to be energized from respective ones of said supply circuits, and to supply power to the alternating-current load-circuit; each converter-assembly comprising a plurality of power-tubes each having a main anode-cathode circuit and a control electrode which is, in general, ineffective to stop the firing of the tube, once the firing has been initiated; control-means for causing each of the converter-assemblies to transmit power in a single direction, said control-means including a separate output-frequency oscillator-means, connected in the control-circuits of the power-tubes of each of the converter-assemblies, the oscillator means of all of the converter-assemblies inherently having substantially the same frequency; and strong-tie connecting-means for parallel-connecting the oscillator-means of all of said converter-assemblies.

JOHN L. BOYER.

REFERENCES CITED

The following references are of record in the file of this patent:

UNITED STATES PATENTS

| Number | Name | Date |
|---|---|---|
| 2,038,505 | Winograd | Apr. 21, 1936 |
| 2,218,383 | Herskind | Oct. 15, 1940 |
| 2,220,735 | Smith | Nov. 5, 1940 |
| 2,235,388 | Scharowsky et al. | Nov. 18, 1941 |
| 2,256,755 | Winograd | Sept. 23, 1941 |
| 2,327,971 | Slepian | Aug. 24, 1943 |